United States Patent [19]
Witteborg, Jr.

[11] 3,870,245
[45] Mar. 11, 1975

[54] FISHING SPOOL
[76] Inventor: E. F. Witteborg, Jr., 3050 Duncan Rd., Shreveport, La. 71109
[22] Filed: July 5, 1973
[21] Appl. No.: 376,415

[52] U.S. Cl................. 242/167, 242/84, 242/118.4, 242/84.1 L
[51] Int. Cl........................ B65h 55/00, B65h 75/14
[58] Field of Search..... 242/118.4, 84.21 R, 84.1 L, 242/84.1 M, 84.5 A, 84.51 A, 167, 166, 159

[56] References Cited
UNITED STATES PATENTS
| | | | |
|---|---|---|---|
| 841,796 | 1/1907 | Llewellyn et al. | 141/118.4 |
| 2,863,617 | 12/1958 | Chapin et al. | 242/84.5 A X |
| 2,957,641 | 10/1960 | Humphrey | 242/118.4 X |
| 3,027,113 | 3/1962 | Berger et al. | 242/84.21 R |

FOREIGN PATENTS OR APPLICATIONS
| | | | |
|---|---|---|---|
| 4,508 | 3/1901 | Austria | 242/118.4 |

*Primary Examiner*—George F. Mautz
*Attorney, Agent, or Firm*—John M. Harrison

[57] ABSTRACT

A spool for fishing reels and particularly, open face, spinning-type fishing reels, which is adapted to receive a supply of stored line wound around an inner shaft, the line so wound, communicating with, and ultimately wound around, an outer shaft consisting of an insert removably mounted on the spool in concentric relationship with the inner shaft, to provide a reserve storage of line.

4 Claims, 4 Drawing Figures

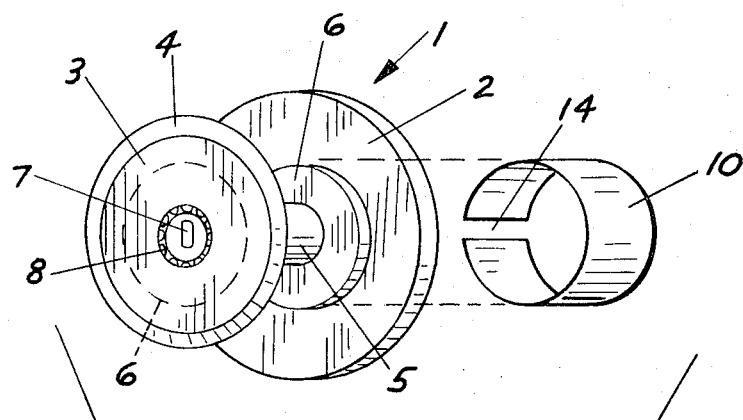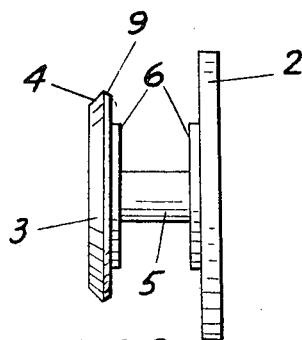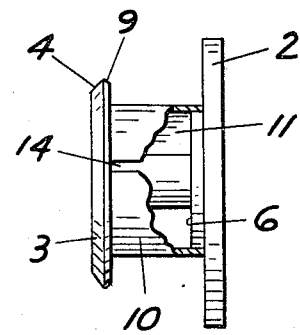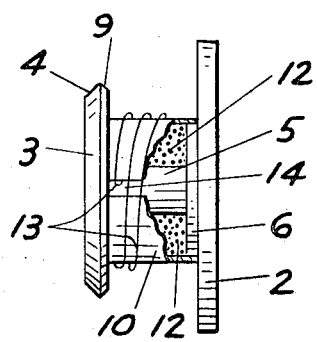

FISHING SPOOL

BACKGROUND OF THE INVENTION

1. Field of the Invention

This invention relates to a new and improved spool for substantially all fishing reels, and particularly, to an improved spool for spinning reels, which spool provides a readily available source of additional line for use when the primary line becomes tangled, knotted, or rendered otherwise for use, thereby necessitating its removal. The spool may be manufactured of suitable size and material to be compatible with any reel, and is preferably light in weight. Furthermore, the spool may be removable from the reel, and line of varying sizes may be placed on interchangeable spools for use on a common reel, as desired. The spool of this invention is adapted to accommodate line of substantially any size, and provides an easy and convenient storage area within the spool itself, thereby necessitating a less frequent incidence of applying new line to the spool.

2. Description of the Prior Art

Heretofore, various spool mechanisms for use with a wide variety of reels, including spinning-type, close face, or spin cast, and level wind casting reels have been developed for use in fishing, and particularly, bass and trout fishing where light monofilament line is preferred to avoid scaring the fish.

The function of spool of this invention, like the spools used in the prior art, may be typified by the line storing reel illustrated in U.S. Pat. No. 3,174,703 to S. Falkum. This patent discloses a reel which consists of an open face spool for accommodating a line, which spool is hand operated by the user as illustrated. The referenced spool is fashioned from an annular band shaped into a shallow channel to accommodate the line, and in use, the line, together with a weight tied on the end thereof, is initially thrown out by hand and allowed to pay out off of the channel and band as the weight travels. The essential features of this invention are incorporated in modern spinning and spin casting reels wherein the spool is also used to store the line and is adapted to pay out and retrieve line through reel mechanisms of varying design as the reel is operated.

One of the problems inherent in the design of conventional spools of this type as well as level wind casting and spin cast spools, is the limited supply of line which may be wound thereon. For example, it frequently becomes neccessary to remove portions of the line while the reel is in use, due to crimping, scraping or breaking of the line itself, thereby shortening the length of line available for casting and future use. Accordingly, at some point during the process of using the reel, the line must be stripped off, a new line applied, and the process repeated in the fishing operation. Still another disadvantage of conventional spools lies in the fact that the shafts upon which the line is wound are frequently deeply cut into the spool to accommodate either more line, or line of a larger diameter then is necessary in the usual fishing operation. Such spool design frequently results in non-use of the line which is closest to the shaft, since this section of line curls and deforms due to the pressure of the line above it to exhibit non-uniform cross-sectional area, which frequently inhibits pay-out of the line, as well as line retrieval over the spool surface.

Accordingly, an object of this invention is to provide an improved spool for substantially all fishing reels, and particularly, spinning-type fishing reels which is simple in design, light in weight and is adapted to provide built-in storage for additional line.

Yet another object of the invention is to provide an improved line storage spool for fishing reels which reduces line loss by replacement to a minimum by providing a storage area for additional line in the spool itself.

Another object of the invention is to provide a fishing spool which is durable, compact, and which allows the fisherman additional fishing time when the line becomes tangled or frayed without the necessity of winding new line thereon.

A still further object of the invention is to provide an improved spool for fishing reels which utilizes the space immediately adjacent to the spool shaft as a storage area for line which may be used when the primary line has become too short to a permit satisfactory casting.

A still further object of the invention is to provide a fishing spool which may be adapted to carry line of substantially any size and weight, some of which line may be carried in stored position immediately adjacent the shaft of the spool and the balance of which is utilized as primary line in the fishing operation.

Yet another object of the invention is to provide a new and improved fishing spool for spinning, spin casting and level wind casting reels in which additional line may be quickly and easily secured from stored position without the necessity of winding new line on the spool when the primary line becomes too short or otherwise unsuitable for use.

SUMMARY OF THE INVENTION

These and other objects of the invention are provided in a fishing spool which includes the following:
1. A hollow shaft with a base attached to one end;
2. A line guide mounted on the opposite end of the shaft;
3. Insert mounts attached to the base and line guide;
4. An insert removably mounted on the insert mounts and spanning the distance between the base and line guide upon which primary line can be wound; and
5. Means in cooperation with the base for mounting the spool on a reel.

BRIEF DESCRIPTION OF THE DRAWINGS

The invention will be better understood in view of the following description presented with reference to the accompanying drawings which illustrate a spool adapted for spinning-type reels.

FIG. 1 of the drawings is a perspective view of the spool of this invention with insert removed, which spool is adapted for mounting on a conventional spinning-type reel;

FIG. 2 is a side view of the spool illustrated in FIG. 1 also with insert removed;

FIG. 3 is another side view, partially in section, of the spool illustrated in FIG. 1 with insert in place; and FIG. 4 is still another side view partially in section illustrating insert in place and the stored and primary line on the spool.

DESCRIPTION OF THE PREFERRED EMBODIMENTS

Referring now to FIGS. 1 and 2 of the drawing, the spool of this invention, generally illustrated by reference numeral 1, is disclosed, with base 2 and line guide 3 mounted on shaft 5. Insert mounts 6 are fitted to base 2 and line guide 3, respectively, in order to support insert 10, upon which the primary line 13, (illustrated in FIG. 4) is wound. Line guide 3 is equipped with bevel 4, and line guide bevel 9, to effect a smooth pay-out of the line from the spool. Reel lock 7 (illustrated in FIG. 1) is adapted to cooperate with a shaft [not illustrated] on the reel to mount the spool. Drag set apertures 8, also illustrated in FIG. 1, are further adapted to cooperate with a drag setting mechanism (not illustrated) on the reel to provide a desired degree of friction in line pay-out when a fish has been hooked and the reel and spool are in functional cooperative operation.

FIG. 3 illustrates a prefered design and configuration of spinning reel spool 1, more particularly illustrating line storage cavity 11 which is adapter to accommodate store line 12, (illustrated in FIG. 4) for future use, and the positioning of insert slit 14, through which the stored line and primary line communicate.

FIG. 4 more particularly illustrates the function of insert 10 in the invention, showing stored line 12 wound upon shaft 5 until line storage cavity 11 is filled, stored line 12 then being caused to traverse insert slit 14, and being wound then on insert 10 as primary line 13 to the desired degree of depth. It will be appreciated that stored line 12 and primary line 13 are a common line which is designated as such to differentiate between line wound on shaft 5 beneath insert 10 and that wound upon insert 10.

In operation, reffering again to the drawings, the spool of this invention is mated to the respective reel for which is designed, and the appropriate amount of drag is placed on the spool by conventional procedures. Insert 10 is then removed, and stored line 12 is wound on shaft 5 to a level approximately equal to the depth of insert mounts 6. Insert 10 is then snapped onto insert mounts 6, the line is fitted through insert slit 14, and is subsequently wound around insert 10 as primary line 13, to a desired level, usually slightly below line guide bevel 9 on line guide 3. The reel and spool are now ready for use, and the storage feature of the invention is utilized as hereinafter set forth.

Through ordinary use, primary line 13 becomes weakened or shortened due to abrasion and kinking, thereby necessitating periodic winding of additional line on conventional spools in conventional reels. However, according to the teachings of this invention, when primary line 13 becomes too short to permit functional use of the reel, a lure is simply attached to the end of the primary line, cast out to a sufficient distance to expose insert 10, and additional stored line 12 is pulled from beneath insert 10 out of line storage cavity 11, insert 10 merely rotating on insert mounts 6 as the desired amount of line is pulled from storage. The lure is then retrieved in conventional manner, with a selected length of additional primary line from line storage cavity 11 being wound on insert 10. This procedure can be repeated as often as necessary until the supply of stored line 12 in line storage cavity 11 is exhausted, at which time it is necessary to replace the stored line, and repeat the procedure set forth above to provide new stored and primary line for the spool.

While it will be appreciated that the spool illustrated in the drawings is adapted for use with spinning reels, as heretofore noted, it will further be appreciated to those skilled in the art that the invention may be adapted for use with level wind casting and spin casting reels as well as other designs wherein line is stored on a spool. For example, the invention may be utilized in the level wind casting reel design typified by parallel end plates of essentially the same size and circular in shape as the base means heretofore described, joined by a shaft. The technique of this invention may be employed by providing a set of insert mounts on the inside surfaces of the parallel end plates of the spool, with an insert spanning the distance between the end plates adapted to cooperate with the mounts to provide a line storage cavity, as in the instant invention. In addition, the particular spool design may be varied, and the depth of the line storage cavity altered to provide a storage space of more or less volume, as desired. Similarly, in the spin cast reel design, the spool may likewise be adapted to store line for future use as disclosed herein with respect to the spinning reel spool.

Having described my invention with the particularity set forth above, what is claimed is:

1. A spool for fishing reels comprising:
   a. A shaft;
   b. Base means, having an inside face and an outside face, said base means being attached to one end of said shaft;
   c. An insert mount attached to said inside face of said base means;
   d. A line guide means having an inside face and an insert mount attached to said inside face in essentially parallel relationship to said insert mount attached to said base means; and
   e. An insert having a smooth inside and outside surface and a gap therein across the entire width thereof adapted to removably and rotatably fit on said insert mounts and span the distance between said base means and said line guide means.

2. The spool of claim 1 wherein fishing line is wound on said shaft and on said insert.

3. The spool of claim 1 wherein said spool is equipped with a reel lock and drag set apertures for cooperation with a reel to selectively set the drag tension on said reel and said spool.

4. The spool of claim 1 wherein:
   (a) Said shaft is hollow;
   (b) Said spool is equipped with a reel lock and drag set apartures for cooperation with a reel to selectively set the drag tension on said reel and said spool;
   (c) Said insert describes essentially a complete circle with a gap between the ends and across the width therof; and
   (d) Fishing line is wound on said shaft, through said gap and onto said insert to a desired depth on said insert.

* * * * *